A. H. DE VOE.
RUFFLING AND STITCHING MACHINE.
APPLICATION FILED FEB. 18, 1908.

949,725.

Patented Feb. 15, 1910.
5 SHEETS—SHEET 1.

A. H. DE VOE.
RUFFLING AND STITCHING MACHINE.
APPLICATION FILED FEB. 18, 1908.

949,725.

Patented Feb. 15, 1910.
5 SHEETS—SHEET 2.

A. H. DE VOE.
RUFFLING AND STITCHING MACHINE.
APPLICATION FILED FEB. 18, 1908.

949,725.

Patented Feb. 15, 1910.
5 SHEETS—SHEET 4.

Witnesses:

Inventor
Albert H. De Voe
By his Attorney

UNITED STATES PATENT OFFICE.

ALBERT H. DE VOE, OF ELIZABETH, NEW JERSEY, ASSIGNOR TO THE SINGER MANUFACTURING COMPANY, A CORPORATION OF NEW JERSEY.

RUFFLING AND STITCHING MACHINE.

949,725.  Specification of Letters Patent.  Patented Feb. 15, 1910.

Application filed February 18, 1908. Serial No. 416,444.

*To all whom it may concern:*

Be it known that I, ALBERT H. DE VOE, a citizen of the United States, residing at Elizabeth, in the county of Union and State of New Jersey, have invented certain new and useful Improvements in Ruffling and Stitching Machines; of which the following is a specification, reference being had therein to the accompanying drawings.

This invention relates to an improvement in ruffling machines adapted for various classes of work, and particularly that class of ruffling mechanism designed for operation upon special forms of articles requiring variations in the degree of fullness of the ruffled portions with adjacent unruffled portions; and the present machine is designed more particularly for stitching and ruffling that class of Japanese footwear known as tabis.

The invention has for its object, among others, the production of ruffles of various length and fullness with intermediate unruffled portions in one ply of material stitched to an unruffled ply of heavier material and means whereby ruffled portions of predetermined length and variable fullness may be located at the will of the operator.

The invention consists in the combination and arrangement of parts herein shown and described and set forth in the appended claims.

In the accompanying drawings, Fig. 3 is a transverse sectional elevation of the machine, looking rearwardly, and Fig. 4 a similar sectional view looking forwardly. Fig. 5 is an external side elevation, Fig. 6 a sectional elevation, and Fig. 7 an end view partly in section, of a portion of the main-shaft with its several actuating cams and eccentrics. Fig. 10 is an elevational view representing upon an enlarged scale the ruffler actuating and controlling mechanisms and other actuating devices driven from the main-shaft, Fig. 11 a perspective view of a portion of the ruffler rock-shaft actuating mechanism, and Fig. 12 a perspective view of the segmental guide-arm for controlling the degree of movement of the ruffler rock-shaft. Fig. 12$^a$ is a detail sectional view of a part of the controlling device. Fig. 13 is a side view of the ruffling members and connected parts in operative position and Fig. 14 a similar view showing said parts in retracted or inoperative position. Fig. 15 is a sectional plan view of the ruffling members and their carrier. Fig. 16 is a side view partly in section, and Fig. 17 a plan of a special form of presser-foot employed in the machine. Fig. 18 is a side view of the clutch device for actuating the feed-cam. Fig. 19 is a plan and Fig. 20 a side view of a tabi, showing the manner in which the toe portions are ruffled or gathered in the use of the present improvement.

The frame of the machine is constructed with a base portion 1 from which projects laterally the work-supporting horn or cylinder 2, and from which rises the bracket-arm 3 overhanging the horn. In the bracket-arm is journaled the longitudinally extending main-shaft 4 carrying at its rearward end the balance wheel 5 and belt-pulley 6.

The main-shaft carries at its forward end the usual crank-plate 7 having a crank-pin embraced by one end of the pitman 8 whose opposite end embraces a lateral pin 9 upon a collar 10 fixed by means of a set screw 11 upon the needle-bar 12 journaled in the forward end of the bracket-arm and carrying a needle 13. The link take-up 14, actuated from an offset crank carried by the needle-bar actuating crank-pin, is of well known construction and operation.

The loop-taker 15 is of the well known oscillating shuttle type and is actuated by means of a driver 16 mounted upon the oscillating shaft 17 deriving its operative movements from a crank 18 upon the rearward end of the main-shaft by means of the pitman 19 and other connections common to the Singer oscillating shuttle machines.

The feed-dog 20 is carried by a slide-block 21 having an aperture to embrace the feed-lifting eccentric 22 upon the shuttle actuating shaft 17 and is mounted in a suitable vertical guide-way in the carrier 23 fixed upon the forward end of the feed-rock-shaft 24 which derives its rocking movements from an actuating eccentric 26 upon the main-shaft embraced by the yoke 27 of the link-bar 28 whose operative movements are controlled by the feed-regulator 29 in a manner common to certain types of Singer machines.

A fixed ruffling blade 30 is attached by means of screws 31 to the bottom of a depending arm 32 of a carrier of which a second arm 33 is formed with a bearing above the fixed ruffling blade in which is fitted a rocking pin 34 having at one end a fixed collar 35 to which is connected by means of the screws 36 a second movable ruffling blade 37.

The carrier is constructed with a long sleeve 38 having at its rearward end a collar or enlargement 39 and with a depending flat portion or plate 40 from which the arms 32 and 33 extend upon opposite sides. The sleeve 38 is mounted upon the ruffler rock-shaft 41 journaled at its forward end in a lateral bearing 42 upon the depending forward portion of the bracket-arm and carries adjacent thereto a crank-arm 43 having a lateral notch 44 adapted to embrace the lateral stud 45 upon the carrier-plate 40 and an adjacent notch 46 with an intermediate cam edge 47. The carrier-plate is formed on one side with a radial socket 48 to which is fitted the latch plug 49 having the lateral slot 50, and a spring 51 is interposed between the plate 52, forming the bottom of the socket 48, and the inner end of a recess in the latch plug 49 to maintain the latter yieldingly in its outer position. One side of the socket is formed with a radial slot 53 which is entered by a pin 54 extended into the transverse slot 50 of the latch plug 49, the pin 54 extending laterally from one arm 55 of the angular carrier-release-lever fulcrumed at 56 upon the carrier-plate 40 and having in the oppositely extending arm 57 an aperture loosely embracing a lateral stud 58 upon one arm of an angle lever 59 secured upon the rocking ruffling blade carrying pin 34 and the other arm of which forms an abutment between which and a shoulder of the carrier-plate 40 is interposed the spring 60 adapted to normally maintain the upper ruffling blade 37 closed upon the lower ruffling blade 30.

Figures 4, 13, 14, 15, 16, 17:
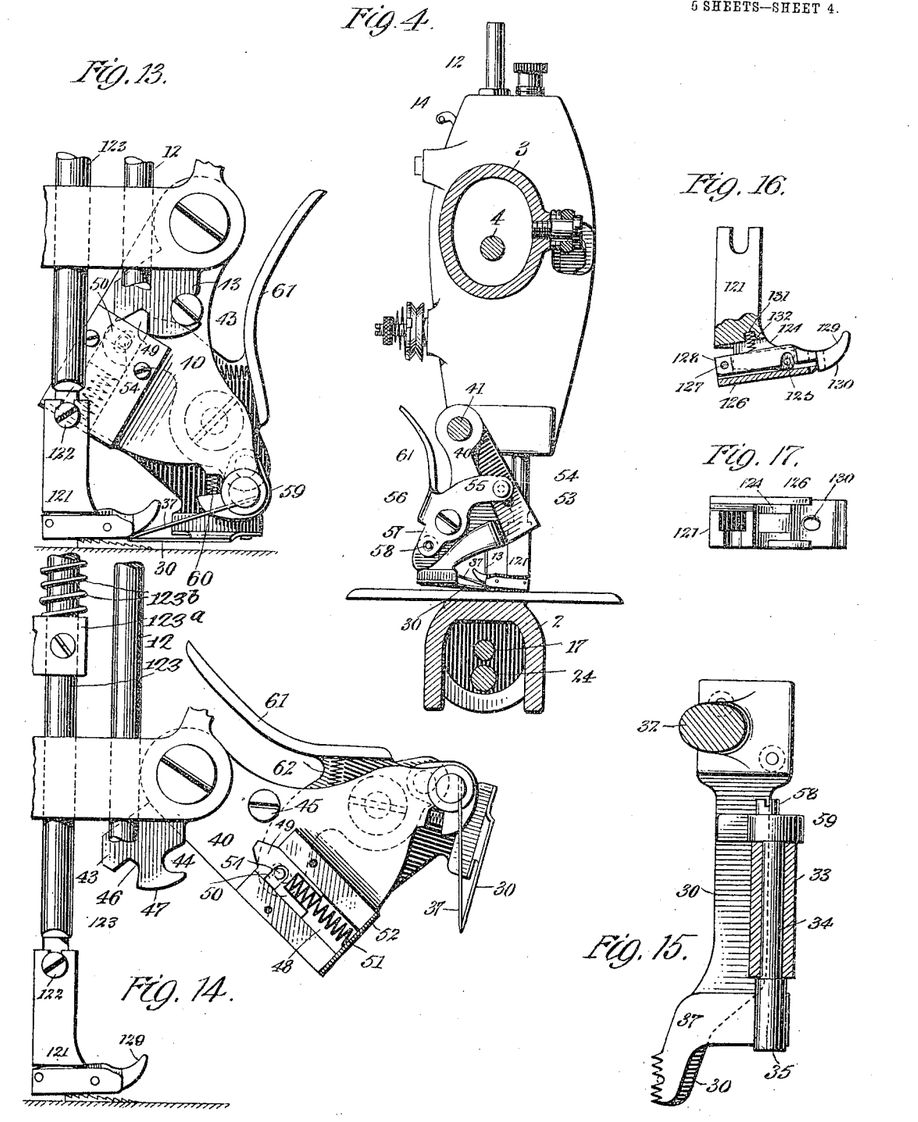
Figure 8:
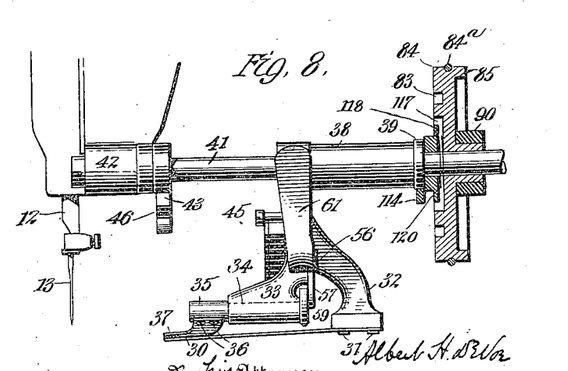
Fig. 8 is a detached side elevation representing the ruffling device and its controlling cam in inoperative relation, and Fig. 9 a similar view of the cam and certain coöperating parts in operative relation.
Figure 9:
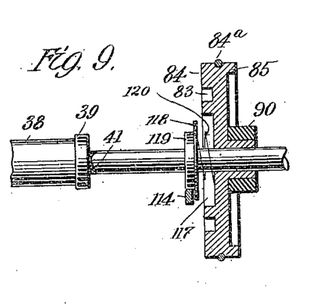
Figures 10, 11, 12:
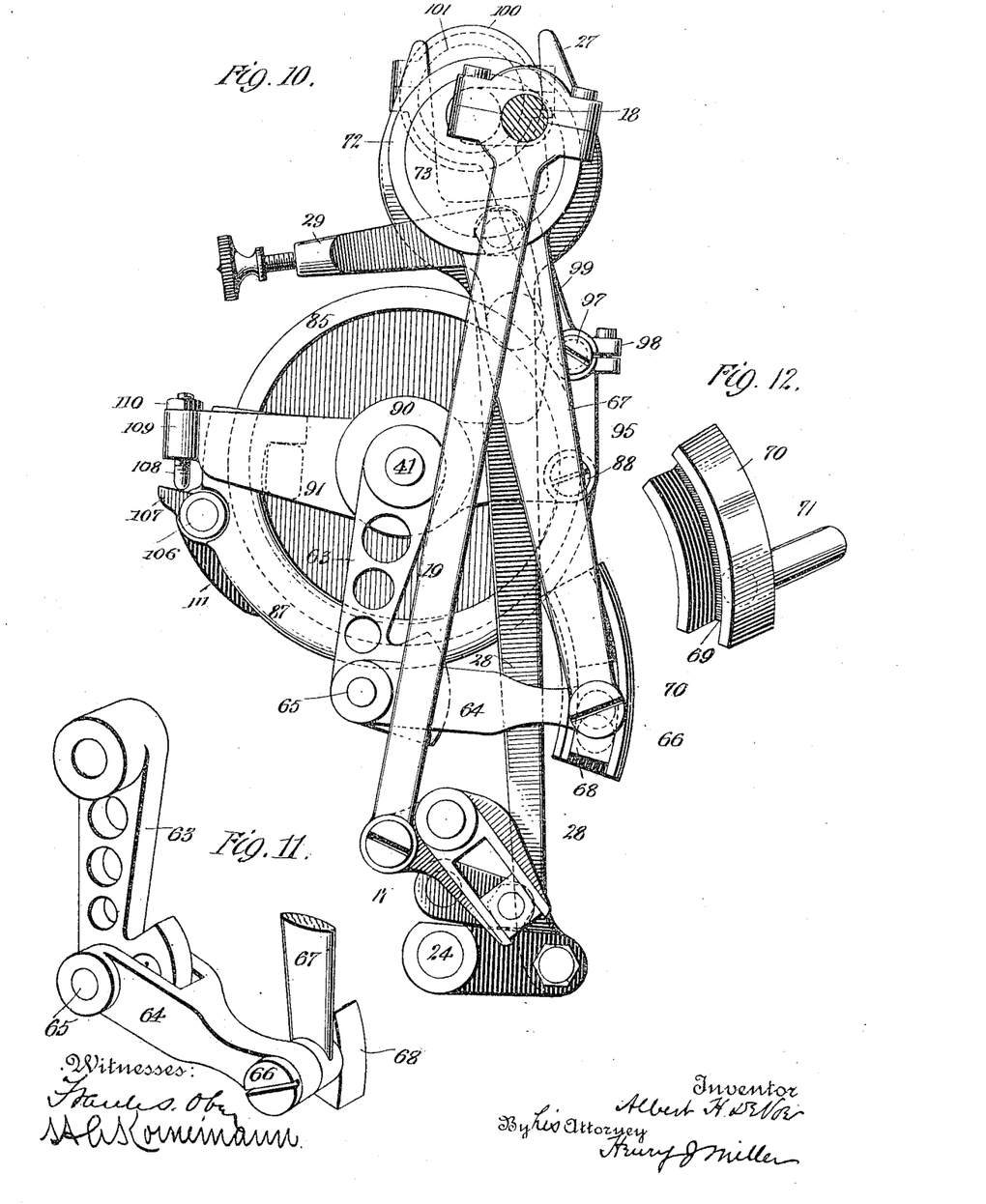

Adjacent its fulcrum 56 the carrier-release-lever is provided with an operating lever 61 for tilting the same upon its fulcrum. The ruffling blade carrier is normally shifted rearwardly out of engagement with the crank-arm 43, as represented in Fig. 8, and in order to place it in operative relation with the stitch-forming mechanism, the sleeve 38 and operating lever 61 are grasped by the operator to tilt the carrier-release lever, whereby the upper ruffling blade 37 is raised from the lower ruffling blade 30 and the latch 49 is simultaneously retracted into its socket. In shifting the carrier forwardly it is swung slightly toward the operator, as represented in Fig. 14 and then advanced into the position represented in Fig. 13, the screw-stud 45 entering the notch 44 with its head upon the opposite side of the crank-arm 43 from the plate 40, whereby the carrier is locked from endwise movement, while the release of the operating lever 61 not only permits the blade 37 to close upon the blade 30 in operative position but enables the latch plug 49 to enter its notch 46 in the crank-arm 43 so as to couple the carrier firmly to the rock-shaft and cause it to partake of the movements of the rock-shaft. To insure the maintenance of the carrier-release-lever in normal position, a spring 62 is interposed between the base of the operating lever 61 and the adjacent edge of the carrier-plate 40. As will be observed, the aperture in the lever arm 57 embracing the stud 58 is sufficiently large to permit a certain amount of lost-motion in order that the latch and the upper ruffling blade may be operated successively as is desirable under certain conditions.

The ruffler rock-shaft 41 extends from the forward portion of the machine rearwardly into the hollow upright portion of the bracket-arm where it is provided with a depending crank-arm 63 fixed thereon and having a segmental lower end serving as a guide which is embraced by the forked inner end of a link 64 pivoted thereto by means of a pin 65 and having its opposite end pivoted by means of a pin 66 to the lower end of the link-bar 67 and a slide-block 68, which latter is fitted to a segmental slide-way 69 in a guide-arm 70 fixed upon the inner end of the rocking pin 71. The radius of curvature of the slide-way corresponds with the length of the link 64, and in the initial inoperative position of the mechanism its center of curvature coincides with the axis of the pivotal pin 65. The link-bar 67 is provided at its upper end with a strap 72 embracing an eccentric 73 upon the main-shaft from which it derives a reciprocatory movement for each rotation of the main-shaft, the angular relation of the guide-arm 70 determining the degree of lateral movement which the crank-arm 63 derives through the link member 64.

The rocking pin 71 is journaled in a suitable bearing in the forward portion of the base of the bracket-arm and carries at its outer end a crank-arm 74 formed with a longitudinal slot 75 in which are fitted the reduced inner portions of a pair of adjustable clamp-blocks 76 connected by means of a clamp-screw 77 with the inner end entering an aperture in a slide-block 76ª fitted to a corresponding slot 78 in a lateral arm 79 of an angular lever mounted upon the fulcrum-pin 80 and having an upwardly extending arm 81 which carries at its upper end a screw-stud 82, the inner end of which is preferably surrounded by a roller, entering a groove 83 in the controlling cam-disk 84. The cam 84 receives a step-by-step rotary motion from actuating mechanism presently to be described, and it will be observed that in its rotation its action upon the stud 82 entering the cam-groove 83 causes the rocking of the angular lever 79 81, which is communicated through the coupling blocks 76, 76$^a$, slotted arm 74 and rocking pin 71 to the guide-arm 70 which in turn so guides the slide-block 68 as to cause the communication of a variable rocking motion between the lower end of the link-bar 67 and the crank-arm 63, with a corresponding variation in the rocking movements of the ruffler rock-shaft 41 and ruffling blades 30 and 37 rigidly connected therewith through their carrier, as represented in Fig. 13. It is evident that the position of adjustment of the coupling blocks 76 intermediate the fulcrum points 71 and 80 serves to determine the degree of operation of the controlling cam 84 upon the guide-arm 70.

Figures 5, 6, 7:
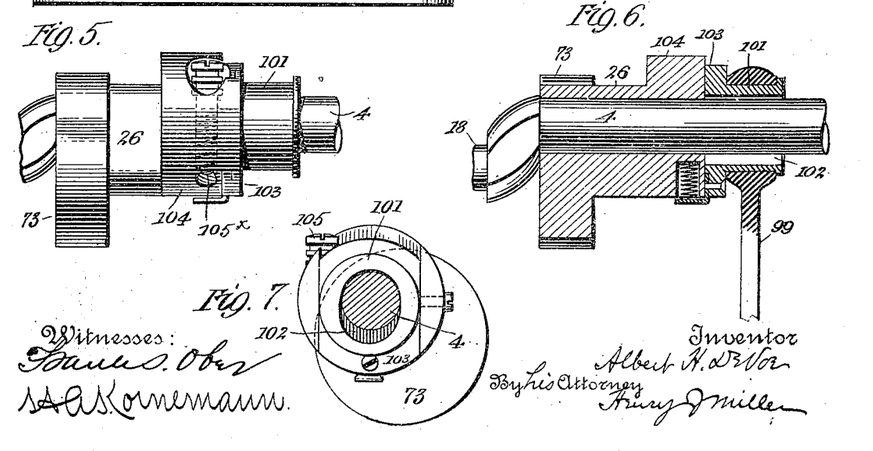

The rearward face of the cam-disk 84 is provided with the annular flange 85, which is embraced by the spaced and similarly curved jaws 86 at the free end of a curved clutch-lever 87 having its opposite end pivotally connected by means of a pin 88 with one arm 89 of an operating lever having a boss 90 fitted loosely upon the hub of the cam-disk 84 and provided with an oppositely extending arm 91 formed with a lateral lug 92 having a socket in which is seated one end of a spring 93 with its opposite end fitted within a similar socket of a lateral lug 94 upon the clutch-lever 87, whereby the pivotally connected members are forced slightly apart to cause the jaws 86 to assume a slightly eccentric relation to the flange 85 so as to have a cramping action thereon in a manner well known. The lever-arm 89 is formed with an upwardly extending lug 95 having a suitably threaded aperture 96 entered by a screw-stud 97 which forms a pivotal connection with a strap 98 at the lower end of an eccentric-rod 99 having at its other end a strap 100 which embraces an adjustable eccentric 101 upon the main-shaft. As represented in Figs. 5, 6 and 7, the eccentric 101 has an elongated aperture 102 embracing the main-shaft 4 and is carried by a slide-plate 103 which is fitted to a transverse guide-way in a fixed collar 104 upon the main-shaft, the construction being similar to that of the feed-actuating eccentric represented in the United States Patent to P. Diehl and A. Gried, No. 814,027, of March 6, 1906. An adjusting screw 105 is formed at one end with a series of annular threads embracing similarly spaced lugs upon the slide-plate 103, and has its opposite end portion screw threaded to engage the corresponding transverse aperture 105$^x$ in the collar 104 whereby the turning of the adjusting screw serves to shift the eccentric 101 transversely upon the main-shaft 4, to vary the action of the eccentric upon the lever 89 91 through the rod 99.

It will be seen that the yielding action of the spring 93 in the oscillation of the levers 89 91 and 87 causes a cramping action of the jaws 86 upon the flange 85 in one direction and the release of the same when moving in the opposite direction, whereby the cam receives a step-by-step rotary motion in one direction only, which acts through its connections with the guide-arm 70 to cause a variable operation of the ruffling blades during the combined stitching and ruffling action of the machine.

To insure against retrograde motion in the backward movement of the operating lever, the cam is provided with the usual peripheral groove to receive the encircling band 84$^a$ whose opposite ends are formed with eyes entered and fastened adjustably to a fixed abutment of the sewing machine frame by a screw 84$^b$.

In the free end portion of the lever 87 is journaled a rocking pin 106 which carries at one end a clutch releasing finger 107 normally resting in contact with the adjacent end of the contact screw 108 mounted in a lug 109 at the end of the lever-arm 91 and provided with a lock-nut 110 to maintain it in fixed adjustment in the threaded aperture of said lug 109. Upon the opposite end of the pin 106 is fixed a tripping finger 111 which lies in the path of movement of a lateral pin 112 carried by an arm 113 of an angular lever fulcrumed upon the screw-stud 82 carried by the vibrating lever 81 and having a second arm 114 extending slightly beneath the ruffler rock-shaft 41 adjacent the cam-disk 84. The arm 114 of this lever is formed with a lug 115 having a socket to receive one end of a spiral spring 116 whose opposite end engages the adjacent edge of the lever 81 and the arm 114 is thus yieldingly pressed upwardly toward the ruffler actuating rock-shaft. The forward face of the cam-disk 84 has a recess 117 to receive the annular flange 118 of a stop-collar 119 loosely mounted upon the shaft 41 but pressed outwardly from the cam by means of a weak spring 120 interposed between the bottom of the recess 117 and the bottom of the flange 118. The diameter of the collar 119 is a trifle larger than that of the collar 39 upon the carrier-sleeve 38.

At the end of a ruffling operation, when it is desired to do plain stitching, the ruffler-carrier is simultaneously disengaged from the work and from its actuating rock-shaft by pressure upon the operating lever 61 to withdraw the latch 49 and elevate the upper ruffling blade 37, the carrier being rocked slightly at the same time to disengage the head of the screw-stud 45 from the crank-arm 43. The carrier is allowed to remain in retracted position, as represented in Fig. 8, until a succeeding ruffling operation is desired, the lever-arm 81 being at this time in its outer position and the arm 114 of the angular tripping lever being in engagement with the lower edge of the collar 39 of the carrier-sleeve 38, whereby the tripping pin 112 is held in engagement with the finger 111 which acts through the pin 106 to maintain the finger 107 in operative engagement with the contact screw 108 by means of which engagement the jaws 86 of the clutch-lever are maintained in concentric and inoperative relation with the flange 85 of the cam 84.

When the carrier is shifted forwardly into operative position as represented in Figs. 1, 2, 9 and 13, the upwardly pressed arm 114 of the tripping lever is released by the collar 39 but its engagement with the extreme forward edge of the collar 119 nearest the collar 39 prevents the latter from advancing with the same and the arm 114 is thus enabled to rise toward the shaft 41 under the action of its spring, which causes the release of the finger 11 and consequently the return of the clutch-lever 87 to operative relation with the cam under the action of the spring 93, thus permitting the continued rotation of the controlling cam under the action of the eccentric 101.

While the throw-in and throw-out device for the cam rotating mechanism permits of an extremely broad scope of operation of the machine, for certain classes of articles of uniform shape and size, it is evident that by the employment of concentric cam portions such throw-in and throw-out devices could be dispensed with and the cam allowed to rotate continuously, plain stitching only being done while the follower 82 remains in the concentric portion of the cam-groove. In cases wherein the circular movement of the cam is reversed at the completion of each ruffling operation or series thereof, it is evident that the right-and-left form of cam-groove may be replaced by a single cam-groove, and the present invention is not therefore limited to the duplicated cam portions shown particularly in Fig. 3 of the drawings.

Opposed to the feed-dog is a presser-foot of special form, as represented in detail in Figs. 16 and 17. This presser-foot is constructed with a shank portion 121 secured by means of the usual fastening screw 122 to the lower end of the presser-bar 123 and having at the lower end a pair of spaced forwardly projecting tongues 124 connected by means of the pivotal pin 125 with the channeled sole member 126 extending backwardly under the rearward portion of the shank 121 and connected by a pivotal pin 127 with the rearward extension 128 of the yielding toe portion 129, the extension 128 being fitted to the channel of the sole portion 126 and notched intermediate its ends where it is embraced by the tongues 124 of the shank 121 and recessed in its lower side to clear the pivotal pin 125. The forward ends of the heel and toe portions are upturned to insure the easy passage beneath them of the work undergoing the ruffling and stitching operations, and the needle-hole 130 is formed through the adjacent edges of the heel and toe portions of the foot. The lower end of the shank 121 is provided intermediate the pivotal pins 125 and 127 with a socket 131 between the bottom of which and the top of the reduced extension 128 of the toe member 129 is interposed a spring 132 serving to normally maintain the toe portion and the rearward end of the heel portion yieldingly pressed downward. The spring-pressed presser-bar 123 is provided with the usual thrust-collar 123$^a$ which is yieldingly forced downwardly by means of the spring 123$^b$ surrounding the upper portion of the presser-bar with its lower end engaging the top of the thrust-collar.

As the ruffling blades are designed to be shifted into and out of operative engagement with the upper ply of material while undergoing a stitching operation and without removal of the same from the machine, it is important that provision should be made for the thrusting of such blades into operative position while opened when the presser-foot is down upon the material. By pivoting the toe portion 129 to the heel portion independent of the latter's connection with the presser-foot shank, the so-called toe portion affords practically an auxiliary presser-foot which is enabled not only to coöperate with the ruffling blades in their normal ruffling operation but to rise readily in opposition to the yielding action of the spring 132 to enable the ruffling blades to enter their operative relation with the stitch-forming mechanism and the work without the raising of the presser-bar and the consequent liability to displacement of the work for such operation.

In the preferred embodiment of the present improvement, both upper and under ruffling blades are employed, but it is evidently immaterial to the present invention in certain of its aspects whether or not both of such ruffling blades are provided, as either of these blades is obviously capable of performing the essential function of the ruffler in crowding the upper ply of material beneath the presser-foot for action of the stitch-forming mechanism.

Figure 1:
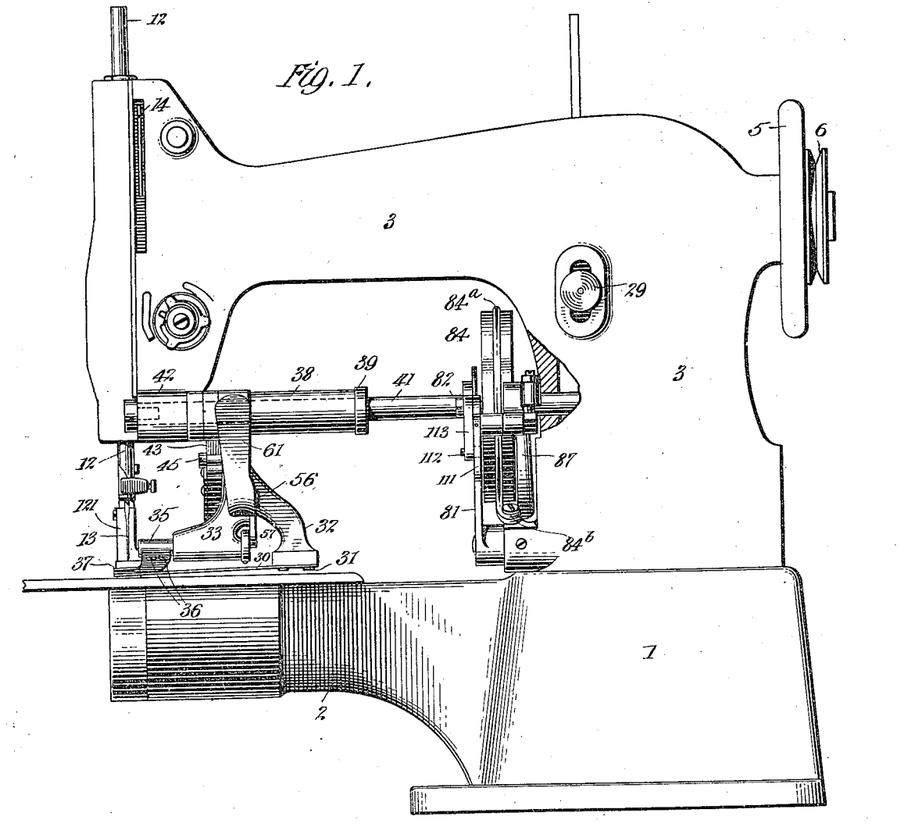
Figure 1 is a front side elevation of a machine embodying the present improvements, and Fig. 2 a rear side elevation of the same with a portion of the work-supporting arm in section.
Figure 2:
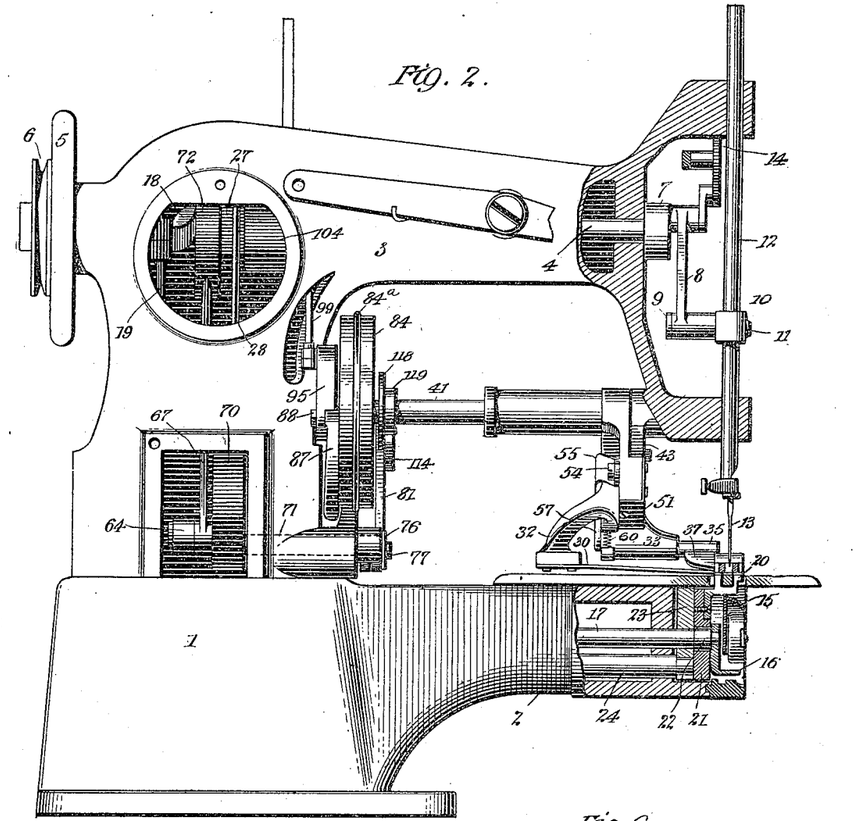
Figures 3, 12A, 18, 19, 20:
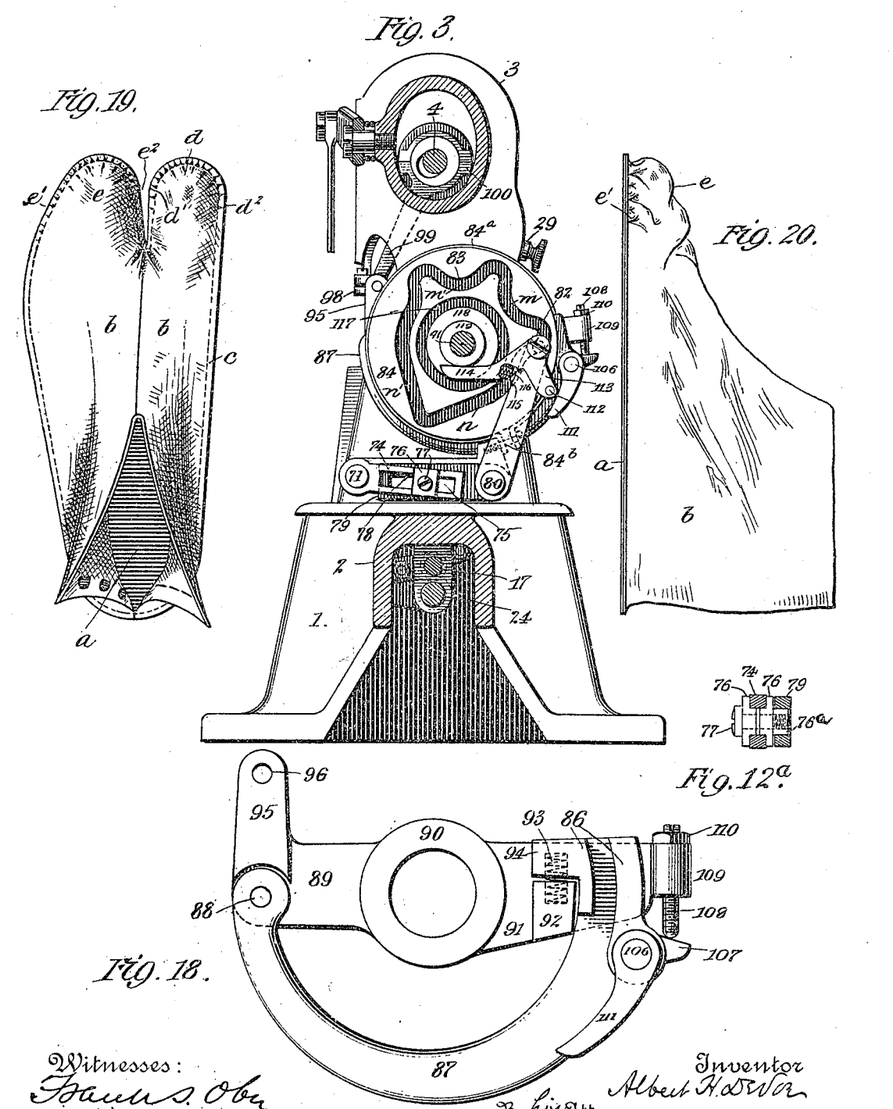

As will be observed by reference to Figs. 19 and 20, the tabi comprises a stiff and thick sole $a$ and an upper $b$ of cloth secured to the latter around the edges by means of a line of stitches $c$. The toe portion is divided, and the greatest fullness in the ruffled toe portions is formed at their forward extremities $d$ and $e$. The sole and upper are secured together while the article is inside out, as represented in Figs. 19 and 20, and the tabi is reversed after the stitching operation.

As shown in the accompanying drawings, the present machine is constructed for stitching successively the right-and-left tabis of each pair, for which reason the cam-groove 83 is formed with reversely arranged portions each adapted to control the ruffling action for each of the divided portions of both tabies of a pair, it being understood that the machine is necessarily built for operating upon the corresponding edges of all articles, so that the tabis may not be introduced upon first one side and then the opposite side of the needle for the stitching and ruffling operations. As represented in Fig. 3, the cam-groove 83 has four extreme outer points causing the lever 81 to be thrown outwardly whereby the engagement of the arm 114 of the angular trip-lever with the periphery of the collar 119 causes the pin 112 to engage the finger 111 for throwing the cam-actuating mechanism out of action while the guide-arm 70 is simultaneously thrown into concentric relation with the pivotal pin 65 of the link 64 to interrupt the action of the ruffler rock-shaft 41. Intermediate the outer cam-points are the inwardly extending cam portions $m$ and $m'$ to control the ruffling of the toe portions $d$ of the tabis and the cam portions $n$ and $n'$ for controlling the toe portions $e$ of the tabis, the portions $m$ and $n$ lying upon one side of a diametrical line of the cam and the portions $m'$ and $n'$ upon the opposite side and in inverse relation in reference to the direction of rotation of the cam. As will be observed, the cam portions $m$ and $m'$ are nearly symmetrical between their extreme outer points, so as to make the fullness in the toe portion $d$ of the tabi nearly the same in the approach and recession from the maximum; while the cam portions $n$ and $n'$ are of irregular form between the extreme outer extremities, whereby in producing the required fullness in the toe portion $e$ of the tabi the approach and recession from the maximum at the extremity of such toe portion is different upon the opposite sides. It will thus be seen that the controlling cam is so formed as to variably control the action of the ruffling mechanism for irregular articles, and the present improvement is believed to be the first instance in which mechanism has been embodied for such action.

In the operation of the machine, the two parts of the tabi are associated together, inside-out as before explained, and the stitching is started at the heel in order to properly locate one of the flaps centrally of the heel portion. After the plain stitching has progressed to the point $e'$, the ruffler-carrier is shifted forwardly into operative position, the blades being separated as before described, to enable the lower blade to enter between the upper and lower plies and the upper blade to rest upon the upper ply. In the further operation of the machine the stitching continues and the ruffling device starts and gradually increases its action upon the upper ply to the maximum throw of the ruffling blades and then diminishes to the throw-out point, which is at $e^2$. The carrier is now shifted backwardly into engagement with the collar 119, forcing the same inwardly into the recess 117 of the cam 84, where it rests, as represented in Fig. 8, until the stitching has been completed of the remainder of the toe portion $e$ and the beginning of the toe portion $d$. At the point $d'$, the ruffler-carrier is again thrown forward into operative position to engage the upper ply of material, and in the further stitching operation a similar variable ruffling action to that already described is effected up to the point $d^2$, after which the ruffler-carrier is again thrown backwardly into extreme retracted position and the plain stitching of the final edge of the tabi continued to the initial starting point at the heel.

While the present improvement has been herein described as constructed and adapted for the stitching and ruffling of tabis, it is evidently adapted for similar operation upon other articles of irregular shapes, or those requiring different and varying degrees of fullness in different parts, while certain of its features are equally adapted to entirely different classes of work than that herein described; and it is therefore to be understood that the present improvement is not limited to the specific embodiment herein shown and described but is capable of embodiment in machines for general use in various classes of work.

In the present embodiment of this improvement, a thin ruffling blade is employed to propel the ply of material to be ruffled faster than the action of the primary or lower feed mechanism in order to crimp or full the material, but the specific nature of the auxiliary feeding member is not an essential of the present improvement, as the function of the ruffling or secondary feeding member is in any case to advance the material to the stitch-forming mechanism more rapidly than it is propelled therefrom by the primary feeding device.

Having thus set forth the nature of the invention, what I claim herein is:—

1. In a ruffling machine, in combination, a ruffling member, actuating mechanism therefor comprising means whereby the stroke of said ruffling member is automatically varied in the performance of a succession of ruffling or gathering movements, manually controlled means for initiating the operation of the ruffling member, and automatically acting means for interrupting the operative movements of the ruffling member.

2. In a ruffling machine, in combination, a ruffling member, actuating mechanism therefor comprising intermittingly moving controlling means whereby the stroke of said member is automatically varied differently in the approach to and recession from the maximum ruffling stroke in the performance of a succession of ruffling or gathering movements, and automatically acting means for arresting the movement of the controlling means, whereby the ruffling operation is interrupted at the end of a predetermined ruffling period.

3. In a ruffling machine, in combination, a ruffling member, actuating mechanism therefor comprising controlling means whereby the stroke of said member is automatically varied differently in the approach to and recession from the maximum ruffling stroke in the performance of a succession of ruffling or gathering movements, and automatically acting means actuated by said controlling means for rendering the latter inactive at the end of a predetermined ruffling period.

4. In a ruffling and stitching machine, the combination with stitch-forming and feeding mechanisms, of a ruffling device bodily movable into and out of operative relation with the stitch-forming mechanism, actuating mechanism therefor comprising means for imparting operative movements to the ruffling member, and a controller for said actuating mechanism including means for automatically varying differently the action of said actuating mechanism upon the ruffling member in the approach to and recession from the maximum ruffling stroke in performing a succession of ruffling or gathering movements.

5. In a ruffling machine, in combination, a ruffling member, actuating mechanism therefor comprising means for imparting operative movements to the ruffling member, a rotary cam and connections intermediate the same and said actuating mechanism adapted to variably control the operation of the latter for imparting to the ruffling member consecutive operative strokes of variable length, and means for regulating the speed of movement of said cam.

6. In a ruffling machine, in combination, feeding mechanism, means for adjusting the effective action of the same, a ruffling member, actuating mechanism therefor, a controller for said actuating mechanism adapted to determine the period of action of the ruffling member and to govern the action of the actuating mechanism for imparting to the ruffling member consecutive operative strokes of variable length, and means for adjusting the speed of action and extent of movement of said controller.

7. In a ruffling machine, in combination, feeding mechanism, means for adjusting the effective action of the same, a ruffling member, actuating mechanism therefor, a controller for said actuating mechanism adapted to determine the period of action of the ruffling member and to govern the action of the actuating member for imparting to the ruffling member consecutive operative strokes of variable length, and independently adjustable means for determining the speed of action and extent of movement of said controller and the maximum length of ruffler throw.

8. In a ruffling machine, in combination, a ruffling member, actuating mechanism therefor, and controlling means for said actuating mechanism comprising a circularly moving cam member provided with a plurality of extreme operative points and a plurality of intermediate cam portions of different shapes, a follower adapted to successively engage said cam portions in the control of said actuating means, and a throw-out device in operative relation with said follower whereby the circular movement of said cam is interrupted when the follower reaches said extreme operative points of the cam.

9. In a ruffling machine, in combination, a ruffling member, actuating mechanism therefor, and controlling means for said actuating mechanism comprising a circularly moving cam member provided with a plurality of extreme operative points and a plurality of intermediate cam portions of different shapes, means including a friction clutch for actuating said cam, a rock-lever carrying a stud or projection adapted to successively engage said cam portions in the control of said actuating means, and means carried by said rock-lever for disengaging said cam from operative connection with its actuating means.

10. In a ruffling machine, in combination, a ruffling member, actuating mechanism therefor, controlling means for said actuating mechanism comprising a rotary cam provided with a plurality of extreme operative points and a plurality of intermediate cam portions of different shapes, a follower connected with said actuating mechanism and adapted to successively engage said cam portions in the control of said actuating means, throw-out mechanism for interrupting the movement of said cam at said extreme points, and means for throwing said cam into operation.

11. In a ruffling machine, in combination, a ruffling member, actuating mechanism therefor comprising a rock-shaft, a crank-arm fixed thereon, a link having one end connected with said crank-arm, a pivotally mounted guide-arm with which the other end of said link is slidingly connected, an actuating shaft provided with a crank or eccentric, and a bar having at one end a strap embracing said crank or eccentric and having at the other end a pivotal connection with said link adjacent its connection with the guide-arm, and means for adjusting the angular relation of said guide-arm to the pivotal connection of said link with the crank-arm upon the rock-shaft.

12. In a ruffling machine, in combination, a ruffling member, actuating mechanism therefor comprising a rock-shaft, a crank-arm fixed thereon, a reciprocating and laterally movable bar, a pivotally mounted guide-arm with which one end of said bar has a sliding connection, a link connection intermediate said bar and the crank-arm of said rock-shaft, and means for adjusting the angular relation of said guide-arm with the direction of reciprocation of said bar.

13. In a ruffling machine, in combination, a ruffling member, actuating mechanism therefor comprising a reciprocating and laterally movable member having an operative connection with the ruffling member, and a guide-arm with which the same is slidingly connected, means for imparting reciprocating movements to the second-named member, a rocking pin upon one end of which said guide-arm is fixed, a crank-arm rigidly attached to the said rocking pin, a circularly moving controlling cam, a follower for said cam connected with the crank-arm of said rocking pin, and means for rotating said cam.

14. In a ruffling machine, in combination, a ruffling member, actuating mechanism therefor comprising a reciprocating and laterally movable member having an operative connection with the ruffling member, and a guide-arm with which the same is slidingly connected, a rocking pin upon which said guide-arm is fixed, a crank-arm rigidly attached to said rocking pin, a plural-armed lever fulcrumed independently of said rocking pin with one of its arms overlapping and adjustably connected with said crank-arm of the rocking pin and having its other arm provided with a lateral stud, a circularly moving controlling cam in operative relation with the lateral stud of said plural-armed lever, and means for rotating said cam.

15. In a ruffling machine, in combination, a ruffling member, actuating mechanism therefor comprising a reciprocating and laterally movable member having an operative connection with the ruffling member, and a guide-arm with which the same is slidingly connected, a rocking pin upon which said guide-arm is fixed, a crank-arm rigidly attached to said rocking pin, a plural-armed lever fulcrumed independently of said rocking pin with one of its arms overlapping and adjustably connected with said crank-arm of the rocking pin and having its other arm provided with a lateral stud, a circularly moving controlling cam in operative relation with the lateral stud of said plural-armed lever, means for rotating said cam, and a throw-in and throw-out device connected with the cam-rotating device whereby the rotation of the cam may be established and interrupted.

16. In a ruffling machine, in combination, a ruffling member, actuating mechanism therefor comprising a reciprocating and laterally movable member having an operative connection with the ruffling member, and a guide-arm with which the same is slidingly connected, a rocking pin upon which said guide-arm is fixed, a crank-arm rigidly attached to said rocking pin, a plural-armed lever fulcrumed independently of said rocking pin with one of its arms overlapping and adjustably connected with said crank-arm of the rocking pin and having its other arm provided with a lateral stud, a circularly moving controlling cam in operative relation with the lateral stud of said plural-armed lever, means for rotating said cam, a throw-in and throw-out device connected with the cam-rotating device whereby the rotation of the cam may be established and interrupted, and means controlled respectively manually and automatically at the beginning and end of the ruffling operation for operating said throw-in and throw-out device to establish and interrupt the movement of said cam.

17. In a ruffling machine, in combination, a ruffling member, actuating mechanism therefor, and a controlling device for said actuating mechanism consisting of a rotary cam, a follower therefor connected with and adapted to vary the relation of operative members of said actuating mechanism, a cramping lever in normal operative relation with said cam, an operating lever pivotally connected with said cramping lever, a spring interposed between said levers for maintaining said cramping lever yieldingly in operative relation with the cam, disengaging means for overcoming the action of said spring, and means for actuating said disengaging means to cause said cramping lever to alternately assume operative and inoperative relations with said cam.

18. In a ruffling machine, in combination, a ruffling member, actuating mechanism therefor, and a controlling device for said actuating mechanism consisting of a rotary cam, a follower therefor connected with and adapted to vary the relation of operative members of said actuating mechanism, a cramping lever in normal operative relation with said cam, an operating lever pivotally connected with said cramping lever, a spring interposed between said levers for maintaining said cramping lever yieldingly in operative relation with the cam, a rocking device applied to one of said levers and provided with a finger adapted to engage an abutment upon the other of said levers for relatively moving them in opposition to said spring and having also a tripping finger, and means carried by the follower of said cam for engaging said tripping finger to disengage said cramping lever from the cam.

19. In a ruffling and stitching machine, the combination with stitch-forming and feeding mechanisms, of a ruffling device movable into and out of operative relation with the stitch-forming mechanism, means for actuating the same, spring actuated locking means for connecting said ruffling device to its actuating means in operative position, and means for effecting the release of said ruffling device from its actuating means and enabling it to be shifted out of operative position.

20. In a ruffling and stitching machine, the combination with stitch-forming and feeding mechanisms, of a ruffling device movable transversely of the direction of feed into and out of operative relation with the stitch-forming mechanism, actuating means in normal inoperative relation with said ruffling device, and a locking device comprising a spring-pressed latch and an operating lever therefor whereby said ruffling device is temporarily maintained in operative relation with its actuating means and in operative position in relation to the stitch-forming mechanism.

21. In a ruffling and stitching machine, the combination with stitch-forming and feeding mechanisms, of a ruffling device bodily movable into and out of operative relation with said stitch-forming mechanism and comprising a plurality of connectedly mounted simultaneously operative work-engaging blades and means for separating said blades, and means for actuating said ruffling device.

22. In a ruffling and stitching machine, the combination with stitch-forming and feeding mechanisms, of a ruffling device movable into and out of operative relation with said stitch-forming mechanism and comprising a plurality of work-engaging blades, a reciprocating carrier upon which said blades are mounted and means including a common operating member whereby said blades may be opened and closed while in initial operative position and the ruffling device locked in and released from operative relation with the stitch-forming mechanism.

23. In a ruffling and stitching machine, the combination with stitch-forming and feeding mechanisms, of a ruffler-actuating rock-shaft provided with a fixed crank-arm, means for actuating said rock-shaft, a ruffling device loosely mounted upon said rock-shaft for oscillatory movement and for endwise movement into and out of operative relation with the stitch-forming and feeding mechanisms, and positively acting means for detachably locking said ruffling device to said crank-arm in fixed position upon said shaft for temporary operation in conjunction with said stitch-forming mechanism.

24. In a ruffling and stitching machine, the combination with stitch-forming and feeding mechanisms, of a ruffler actuating rock-shaft provided with a fixed crank-arm, means for actuating said rock-shaft, a ruffling device loosely mounted upon said rock-shaft and movable longitudinally thereof, said ruffling device comprising a plurality of work-engaging blades, and means including a common operating member for simultaneously detachably connecting the ruffling device with said crank-arm and opening the ruffling blades to receive the work.

25. In a ruffling and stitching machine, the combination with stitch-forming and feeding mechanisms, of a ruffler actuating rock-shaft provided with a fixed crank-arm having angularly disposed notches, means for actuating said rock-shaft, a ruffling device comprising a plurality of work-engaging blades and a carrier therefor including a sleeve loosely mounted upon said rock-shaft and movable longitudinally thereof, a headed stud and a spring-pressed latch respectively adapted to engage the notches in said crank-arm, a release lever, and connections intermediate the same and said latch and one of said ruffling blades for effecting the simultaneous withdrawal of the latch to release the carrier and the lifting of said ruffling blade.

26. In a ruffling and stitching machine, the combination with stitch-forming and feeding mechanisms, of a ruffling device movable transversely of the direction of feed into and out of operative relation with the stitch-forming mechanism, actuating mechanism for said ruffling device, a controller for said actuating mechanism comprising a rotary cam and operating means therefor including a throw-in and throw-out device automatically controlled directly from said cam to interrupt the movement of the latter and controlled by the shifting of the ruffling device into operative relation with the stitch-forming mechanism to reestablish the operative movement of said cam.

27. In a ruffling and stitching machine, the combination with stitch-forming and feeding mechanisms, of a ruffler actuating rock-shaft, a ruffling device loosely mounted thereon and adapted for movement to and from operative relation with the stitch-forming mechanism and provided with means for detachably locking the same rigidly to said rock-shaft in operative position, actuating mechanism for said rock-shaft, a controller for said actuating mechanism comprising a rotary cam and a follower therefor, operating mechanism for said cam including a normally operative clutch, and means connected with said follower and adapted to engage a member of the ruffling device when in inoperative position, whereby the clutch is automatically disengaged in the normal action of the cam and is permitted to return to operative position by the shifting of said ruffling device from inoperative to operative position.

28. In a ruffling and stitching machine, the combination with stitch-forming and feeding mechanisms, of a ruffling device movable into and out of operative relation with the stitch-forming mechanism, actuating mechanism therefor, means controlled by the shifting of the ruffling device into operative position for tripping the actuating mechanism into action, and means controlled independently of said ruffling device for throwing said actuating mechanism out of action.

29. In a ruffling and stitching machine, the combination with stitch-forming and feeding mechanisms, of a ruffling device movable transversely of the direction of feed into and out of operative relation with the stitch-forming mechanism, actuating mechanism therefor, means controlled by the shifting of the ruffling device into operative position for tripping the actuating mechanism into action, and means controlled independently of said ruffling device for throwing said actuating mechanism out of action.

30. In a ruffling and stitching machine, the combination with stitch-forming and feeding mechanisms, of a ruffling device comprising a carrier, a pair of overlying ruffling blades mounted thereon with their operative edges arranged substantially coincidently the one above the other and thus adapted to engage both upper and lower faces of interposed material at substantially the same point, means including a lever pivotally mounted upon said carrier for separating said ruffling blades to receive a ply of material and means for imparting to-and-fro operative movements to said carrier.

31. In a ruffling and stitching machine, the combination with stitch-forming and feeding mechanisms, of a carrier movable into and out of operative position transversely of the direction of feed, a pair of overlapping ruffler blades mounted upon said carrier, one of which is movable toward and from the other, means for separating said ruffler-blades to receive a ply of material, and means for imparting a to-and-fro movement to said carrier while in operative position.

32. In a ruffling and stitching machine, the combination with stitch-forming and feeding mechanisms, of a ruffling device comprising a ruffling blade movable into and out of operative relation with the stitch-forming mechanism within the direction of feed, means for actuating said ruffling device while in operative position, a spring actuated presser-bar, a primary presser-foot attached to said bar and coöperating with the stitch-forming and feeding mechanism in operation upon the work, and an auxiliary presser-foot yieldingly connected with the primary presser-foot independently of said presser-bar and adapted to coöperate with said ruffling blade in the presentation of the ruffles or gathers to the stitch-forming mechanism.

33. In a ruffling and stitching machine, the combination with stitch-forming and feeding mechanisms, of a ruffling device comprising a plurality of overlapped and coincidently extending ruffling blades movable into and out of operative relation with the stitch-forming mechanism within the direction of feed, means for actuating said ruffling device while in operative position, a spring actuated presser-bar, a primary presser-foot attached to said bar and coöperating with the stitch-forming and feeding mechanisms in operation upon the work, and an auxiliary presser-foot yieldingly connected with the primary presser-foot independently of said presser-bar and adapted to coöperate with said ruffling blades in the presentation of the ruffles or gathers to the stitch-forming mechanism.

34. In a ruffling and stitching machine, the combination with stitch-forming and feeding mechanisms, of a ruffling device comprising a plurality of overlapped and coincidently extending ruffling blades independently mounted and provided with means for separating them to admit a ply of material and movable into and out of operative relation with the stitch-forming mechanism within the direction of feed, means for actuating said ruffling device while in operative position, a spring-actuated presser-bar, a primary presser-foot attached to said bar and coöperating with the stitch-forming and feeding mechanisms in operation upon the work, and an auxiliary presser-foot yieldingly connected with the primary presser-foot independently of said presser-bar and adapted to coöperate with said ruffling blades in the presentation of the ruffles or gathers to the stitch-forming mechanism.

35. In a ruffling and stitching machine, the combination with stitch-forming and feeding mechanisms, of a ruffling device comprising a ruffling blade movable into and out of operative relation with the stitch-forming mechanism within the direction of feed, means for actuating said ruffling device while in operative position, a spring-actuated presser-bar, a presser-foot shank attached to said bar and provided with spaced laterally projecting tongues, a channeled primary foot member entered by and pivotally connected at its forward end with said tongues, an auxiliary foot member disposed in advance of the primary foot member and having an extension pivoted to the rearward end of the latter, and a spring interposed between the top of said extension and the bottom of said shank.

In testimony whereof, I have signed my name to this specification, in the presence of two subscribing witnesses.

ALBERT H. DE VOE.

Witnesses:
   D. B. BIRNIE,
   H. J. MILLER.